United States Patent
Manion et al.

(10) Patent No.: US 9,237,167 B1
(45) Date of Patent: Jan. 12, 2016

(54) SYSTEMS AND METHODS FOR PERFORMING NETWORK COUNTER MEASURES

(75) Inventors: Amanda Marie Manion, Columbus, OH (US); Stanley A. Szwalbenest, Newtown, PA (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 563 days.

(21) Appl. No.: 12/183,872

(22) Filed: Jul. 31, 2008

Related U.S. Application Data (60) Provisional application No. 61/022,137, filed on Jan. 18, 2008.

(51) Int. Cl.
*H04L 29/06* (2006.01)
*H04L 29/08* (2006.01)

(52) U.S. Cl.
CPC ........ *H04L 63/1466* (2013.01); *H04L 63/0823* (2013.01); *H04L 67/14* (2013.01); *H04L 67/22* (2013.01)

(58) Field of Classification Search
CPC . H04L 63/08; H04L 63/0823; H04L 63/1433; H04L 63/1441; H04L 63/1466; H04L 63/1475; H04L 63/1483; H04L 67/1065; H04L 67/14; H04L 67/22
See application file for complete search history.

(56) References Cited

U.S. PATENT DOCUMENTS

| | | | |
|---|---|---|---|
| 6,510,464 B1* | 1/2003 | Grantges et al. | 709/225 |
| 6,792,539 B1* | 9/2004 | Oishi et al. | 713/194 |
| 7,139,760 B2* | 11/2006 | Manion | G06F 17/30206 |
| 7,873,998 B1* | 1/2011 | Wilkinson et al. | 726/22 |
| 7,881,329 B2* | 2/2011 | Hooper et al. | 370/457 |
| 7,984,500 B1* | 7/2011 | Khanna et al. | 726/22 |
| 8,069,483 B1* | 11/2011 | Matlock | 726/23 |
| 2001/0011351 A1* | 8/2001 | Sako | 713/180 |
| 2003/0154399 A1* | 8/2003 | Zuk et al. | 713/201 |
| 2005/0028013 A1* | 2/2005 | Cantrell et al. | 713/201 |
| 2006/0020783 A1* | 1/2006 | Fisher | 713/156 |
| 2006/0117385 A1* | 6/2006 | Mester et al. | 726/22 |
| 2006/0156389 A1* | 7/2006 | Brown et al. | 726/5 |
| 2007/0043681 A1* | 2/2007 | Morgan et al. | 705/67 |
| 2007/0234409 A1* | 10/2007 | Eisen | 726/6 |
| 2007/0266439 A1* | 11/2007 | Kraft | 726/26 |
| 2007/0283436 A1* | 12/2007 | Duffield et al. | 726/23 |
| 2008/0247355 A1* | 10/2008 | Ahn | 370/328 |
| 2008/0320567 A1* | 12/2008 | Shulman et al. | 726/4 |
| 2009/0157708 A1* | 6/2009 | Bandini | H04L 12/585 |
| 2009/0307775 A1* | 12/2009 | Brown et al. | 726/23 |

* cited by examiner

*Primary Examiner* — Xavier S. Wong
(74) *Attorney, Agent, or Firm* — Hunton & Williams LLP (57) ABSTRACT

A method and system for detecting fraud in an electronic session performed over a network, the session including communications between a purported customer and a bank operating system, the communications from the customer including headers. The method including inputting the headers, including header attributes, from the purported customer during the session; comparing the header attributes from different communications during the session; determining that the comparison of the header attributes are irregular; and flagging, based on the determining that the comparison of the header attributes are irregular, the session as suspect.

18 Claims, 6 Drawing Sheets

SYSTEMS AND METHODS FOR PERFORMING NETWORK COUNTER MEASURES

RELATED APPLICATION

This application claims priority to U.S. Provisional Patent Application No. 61/022,137 filed Jan. 18, 2008 and entitled SYSTEMS AND METHODS FOR PERFORMING NETWORK COUNTER MEASURES, such application incorporated by reference herein in its entirety.

BACKGROUND OF THE INVENTION

Financial institutions typically use very well known techniques for limiting fraudulent access to secure systems. In particular, larger financial institutions use commonplace methodologies to allow access to a web site, such as the well known user ID and password, followed by a soft token on their computer, such as a cookie (so as to authenticate the computer). A machine signature is often used. A machine signature is a compilation of attributes about the computer, such as software related attributes, IP address and other information. This various data, in the form of a header, and specifically a "https: header" for example, allows access onto a bank's web site. Technically speaking, the "https header" refers to the data that is placed at the beginning of a string of data that is being transmitted. The header contains various attributes about the session (including time information) and the way in which the data should be handled. The criminal element collects this various information and replays it, so as to gain access onto a web site (and so as to appear to be the customer). In particular, the information may be collected to obtain one element to gain access to the site, i.e., that one element being a device signature/GUID (Globally Unique Identifier), for example. The information may well be collected via crimeware.

The current known technology is in some respects lacking in the ability to recognize unauthorized access when crimeware is used.

SUMMARY OF THE INVENTION

The invention provides methods and systems for detecting fraud in an electronic session performed over a network, the session including communications between a purported customer and a bank operating system, the communications from the customer including headers. The method including inputting the headers, including header attributes, from the purported customer during the session; comparing the header attributes from different communications during the session; determining that the comparison of the header attributes are irregular; and flagging, based on the determining that the comparison of the header attributes are irregular, the session as suspect.

BRIEF DESCRIPTION OF THE DRAWINGS

The present invention can be more fully understood by reading the following detailed description together with the accompanying drawings, in which like reference indicators are used to designate like elements, and in which.

DETAILS OF THE INVENTION

The invention includes a reconciliation of electronic "headers" during the course of a session. Based on observed deltas between such headers, a fraudulent transaction may be identified.

Hereinafter, features in accordance with various embodiments of the invention will be described. As used herein, any term in the singular may be interpreted to be in the plural, and alternatively, any term in the plural may be interpreted to be in the singular.

In one aspect, the invention includes a reconciliation of the header that is used to log onto the website vis-à-vis the header that is passed at any other part of the session on that website. For example, a new header is sent (from the customer) every time a web page is refreshed.

To explain, it has been identified that in transactions performed by the criminal element, a first header is used to gain access to the system (as described above). However, it has been determined, as a characteristic of transactions effected by the criminal element, that thereafter different headers are transmitted by the criminal element. The first header is crafted by the criminal element so as to parallel the legitimate customer's header. On the other hand, the subsequent headers (i.e., the various headers transmitted after the criminal element is logged in) are reflective of the criminal's computer. Indeed, such processing might be analogized to a criminal gaining access to a bank vault wearing a bank president mask, and after gaining access, taking off the mask to reveal their true self (and perform their criminal operations). In contrast, with the situation of a legitimate customer performing the transaction, the attributes of the header will be consistent (at least to some degree) throughout the transaction.

Accordingly, in accordance with one embodiment of the invention, the invention leverages this processing attribute and reconciles the header that is used to log onto the website vis-à-vis a header (or headers) that is passed at some other time during the session (i.e., the session in which one or more transactions may be effected, for example). Indeed, comparisons may be performed multiple times during the session, i.e., different headers sent during the session may be compared against the header used at log in, or to each other. This comparing is herein characterized as a "reconciliation."

The reconciliation with a legitimate customer may well show some differences in the headers. In particular, the time dependent information in sequential headers (with a legitimate customer) will indeed change. However, with a criminal, the reconciliation will show substantial differences in the headers. As described above, this is because the criminal is using the fabricated customer's header at log in, and thereafter their own computer's header.

Once the reconciliation shows any suspect changes in the header, then the particular transaction may be flagged and appropriately processed. For example, a flagged transaction might result in the customer's transaction being immediately terminated, with a notice provided. Alternatively, an out of band challenge might be performed. However, in a more stealth oriented approach, the flagged transaction might result in the bank's system allowing the transaction to be effected from the perspective of the supposed criminal element—however, no funds would be transferred until a bank fraud investigator has reviewed the flagged transaction. Yet alternatively, the flagged transaction might result in bank fraud investigator viewing the transaction in real time (i.e., during the transaction). Other processing, as a result of flagging, may also be performed.

In particular, the second option above (in which the transaction is processed, but funds transfer is delayed until the transaction can be reviewed) is of interest from the stealth perspective. In other words, with this second approach, the criminal element would likely not be aware why the fraudulent transaction was flagged and terminated.

In another aspect of the invention, the various headers used during a transaction might be monitored in ways "above and beyond" comparing the first header (used at login) with subsequent headers (used during the transaction). For example, time information on sequential headers might be monitored. That is, it may be the case that the criminal does indeed realize that the various headers are being compared (as described above). As a result, the criminal may attempt to fabricate all the headers during a transaction. However, features of the invention address this situation.

Specifically, time related attributes (e.g. a time stamp) may be compared between sequential headers so as to identify a particular pattern or a particular pace (e.g. a time line of the customer's actions as represented in the data of the header). From the perspective of constituting a biometric, each customer may be associated with a particular pattern/pace. The pattern/pace of the criminal will vary from that of the customer. This variance is determinable, and may be used to tag the transaction as potentially fraudulent. Further, the particular pattern/pace known to be associated with a criminal element or criminal elements might be leveraged, e.g. compared across different transactions.

Various other features may be included in the invention. For example, Geolocation techniques might be used in conjunction with monitoring the header data.

Figure 1:
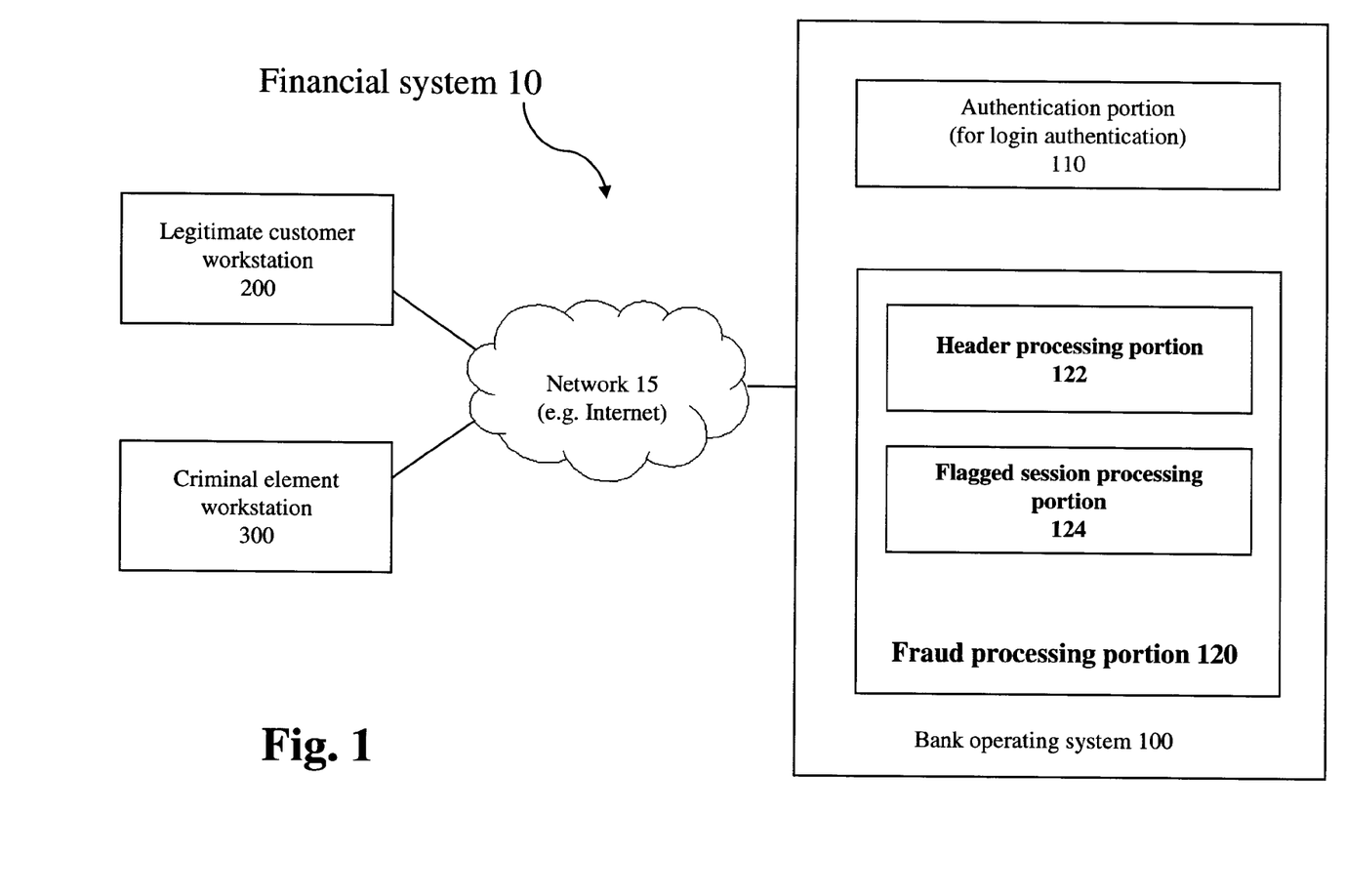
FIG. 1 is a block diagram of an financial system in accordance with one embodiment of the invention.

FIG. 1 is a block diagram of an financial system 10 in accordance with one embodiment of the invention. As shown, the financial system 10 includes a bank operating system 100 and a legitimate customer workstation 200. Also, the financial system 10 includes a criminal element workstation 300. The various components (100, 200 and 300) of the financial system 10 communicate through a network 15, such as the Internet. There may be any number of components (100, 200 and 300), and in particular multiple legitimate customer workstations 200.

As shown in FIG. 1, the bank operating system 100 includes an authentication portion 110. The authentication portion 110 processes the logon (to the bank's system, e.g. web page) and either allows access (based on successful authentication) or refuses access (based on unsuccessful authentication).

The bank operating system 100 also includes a fraud processing portion 120. The fraud processing portion 120 performs various processing in accord with the various features of the invention. The fraud processing portion 120 includes the header processing portion 122 and the flagged session processing portion 124. The header processing portion 122 performs the header reconciliation processing as described herein, including the processing shown in FIGS. 3-5. The flagged session processing portion 124 performs processing as a result of a flagged session. Illustratively, processing performed by the flagged session processing portion 124 is shown in FIG. 6.

Figure 2:
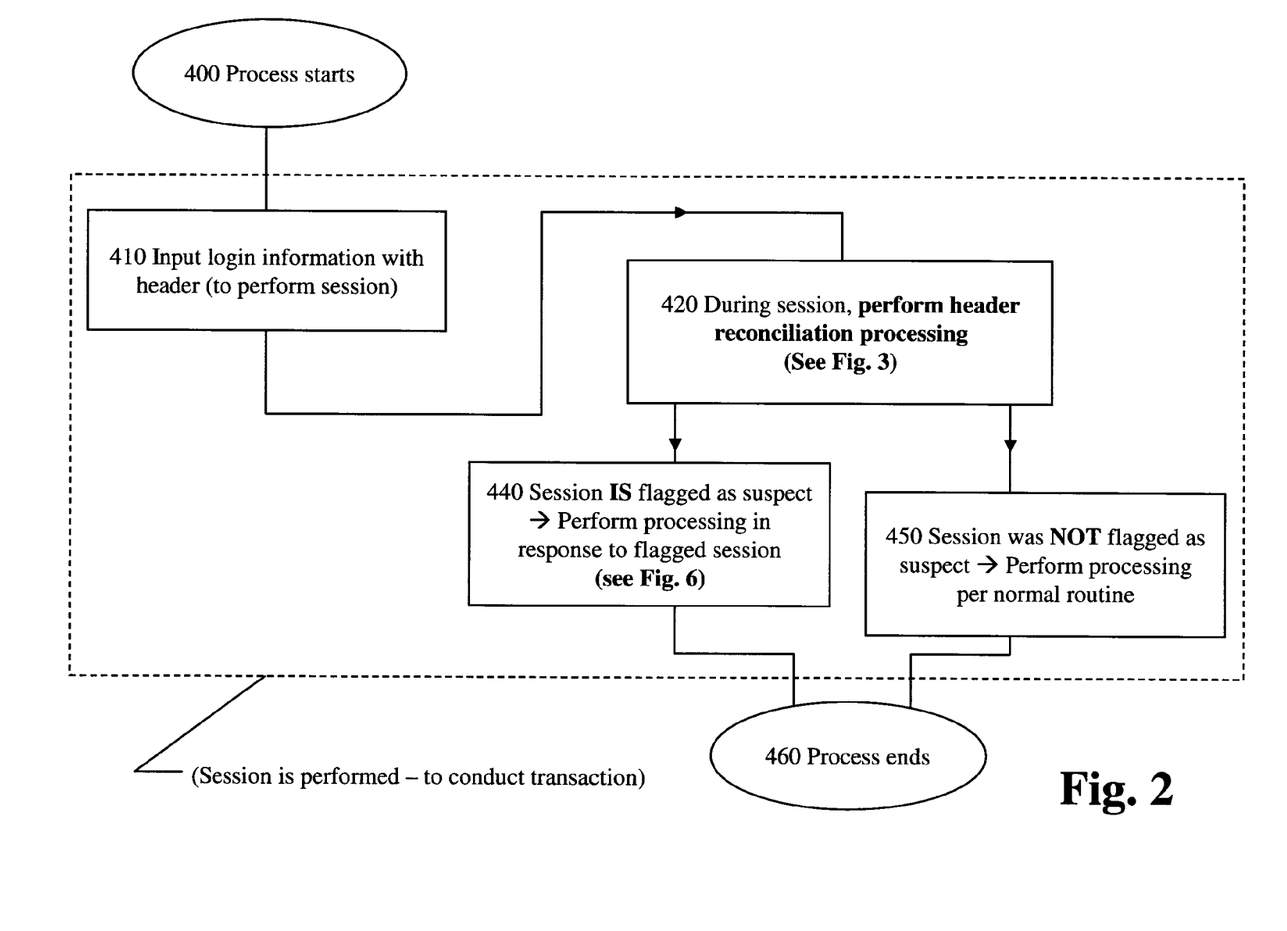
FIG. 2 is a high level flow chart showing further details of the reconciliation processing of headers in accordance with one embodiment of the invention.
Figure 3:
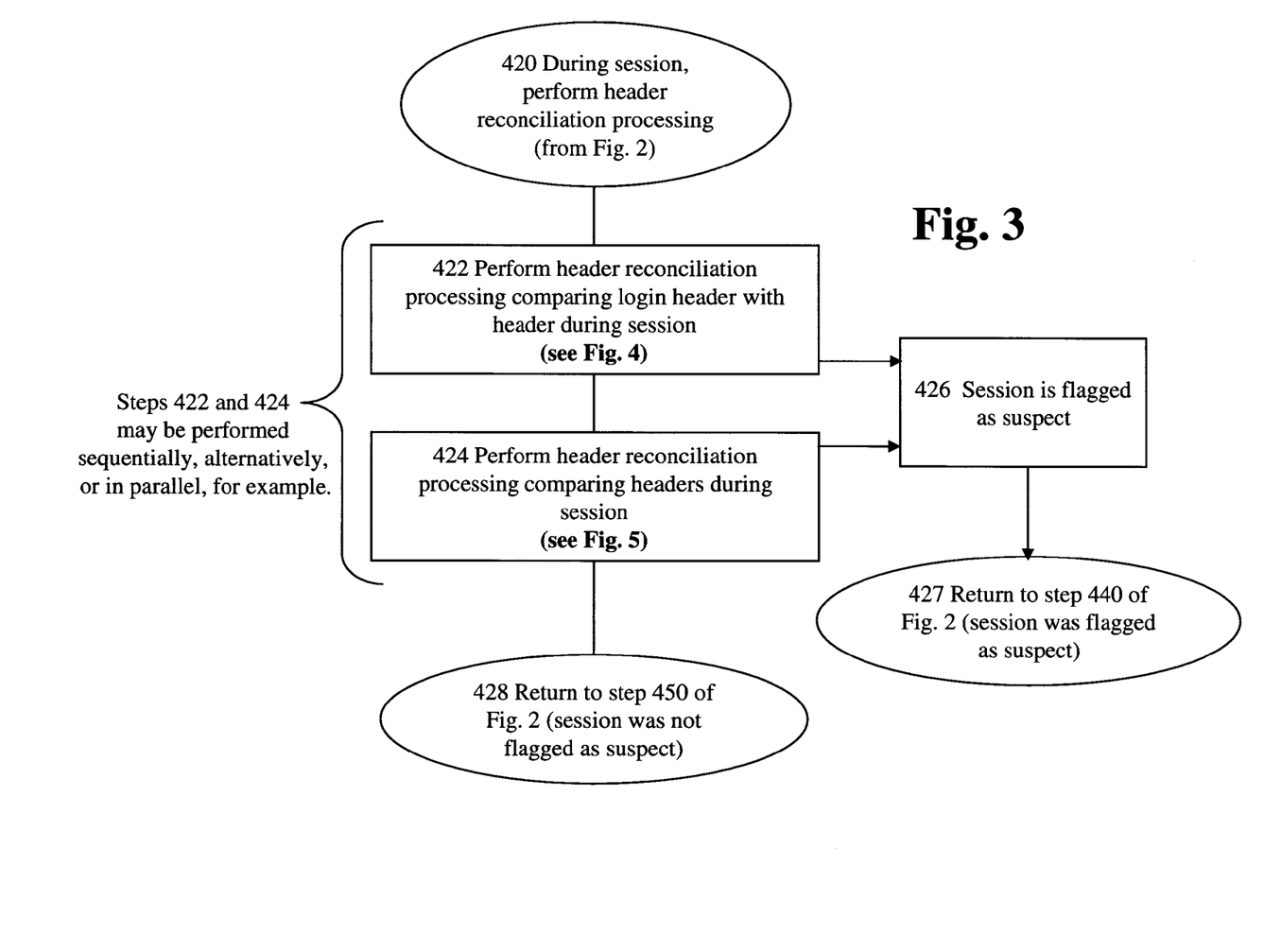
FIG. 3 is a further flowchart showing header comparison processing in accordance with one embodiment of the invention.

FIG. 2 is a high level flow chart showing further details of the reconciliation processing of headers in accordance with one embodiment of the invention. The process starts in step 400. Then, in step 410, the process inputs login information with header (to perform a session for a customer). Then in step 420, during the session, the process performs header reconciliation processing. Further details of this processing are shown in FIG. 3. After step 420 of FIG. 2, the process passes to one of steps 440 and 450. That is, if the session IS flagged as suspect, then the process passes to 440. In step 440, processing is performed in response to the session being flagged. On the other hand, if the session was not flagged as suspect, then the processing passes to step 450. In step 450, processing is performed per normal routine. After either of steps 440 and 450, the process ends in step 460.

FIG. 3 is a further flowchart showing header comparison processing (of FIG. 2) in accordance with one embodiment of the invention.

The sub process of FIG. 3 starts in step 420, and passes to step 422. In step 422, the process performs header reconciliation processing, including comparing login header, i.e., the header submitted at login, with a header submitted at some later time during the session. Further details are described in FIG. 4.

Then, in step 424, the process performs header reconciliation processing in which headers are compared during the session, i.e., multiple headers are performed during the session. Further details of this processing are described in FIG. 5. The processing of FIG. 3 shows steps 422 and 424 being performed sequentially. However, such steps 422 and 424 may be performed sequentially, alternatively, or in parallel, for example.

In FIG. 3, if the comparison of the headers shows irregularities, the process passes to step 426. in step 426, the session is flagged as suspect. Then, after step 426, the process returns to step 440 of FIG. 2 (and processing is performed in response to the flagged status of session).

On the other hand, if no irregularities are observed in the processing of step 422 and 424, then the process passes to step 428. The process returns to step 450, and processing of a normal session is continued.

Figure 4:
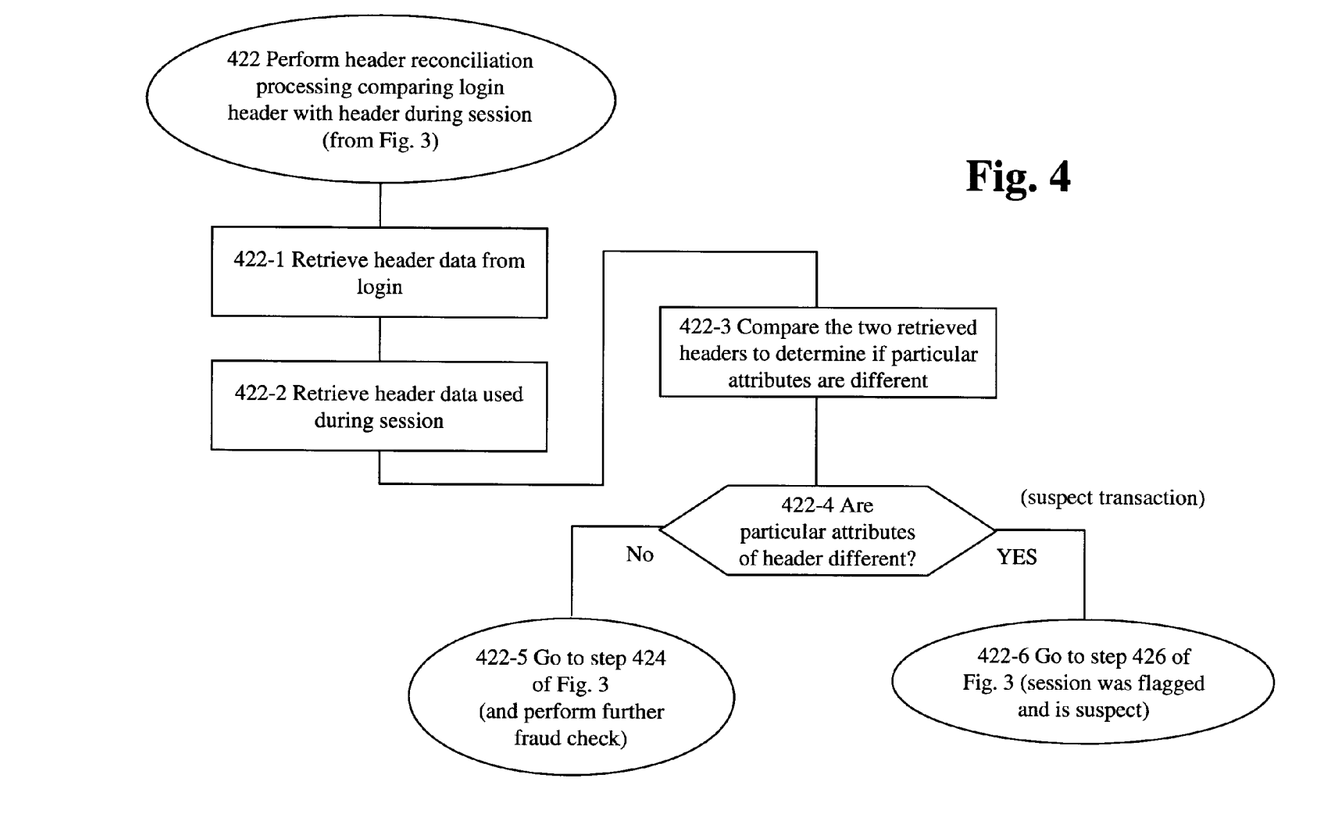
FIG. 4 is a further flowchart showing details of the processing of FIG. 3 in accordance with one embodiment of the invention.

FIG. 4 is a further flowchart showing details of the processing of step 422 of FIG. 3 in accordance with one embodiment of the invention. The process starts in step 422 and passes to step 422-1.

In step 422-1, the process retrieves the header data from the communications used at login. Then in step 422-2, the process retrieves header data used in a communication during session. The process, in step 422-3, then compares the two retrieved headers to determine if particular attributes are different. Then, the process passes to step 422-4.

In step 422-4, decisioning is performed to determine if the particular attributes of the compared headers are different. If they are deemed to be different, then the process passes to 422-6, and thereafter, the session is flagged as suspect.

Alternatively, if no in step 422-4, the process passes to step 422-5. Step 422-5 reflects that no fraud has yet been determined, but that the process will perform further fraud check processing in step 424.

Figure 5:
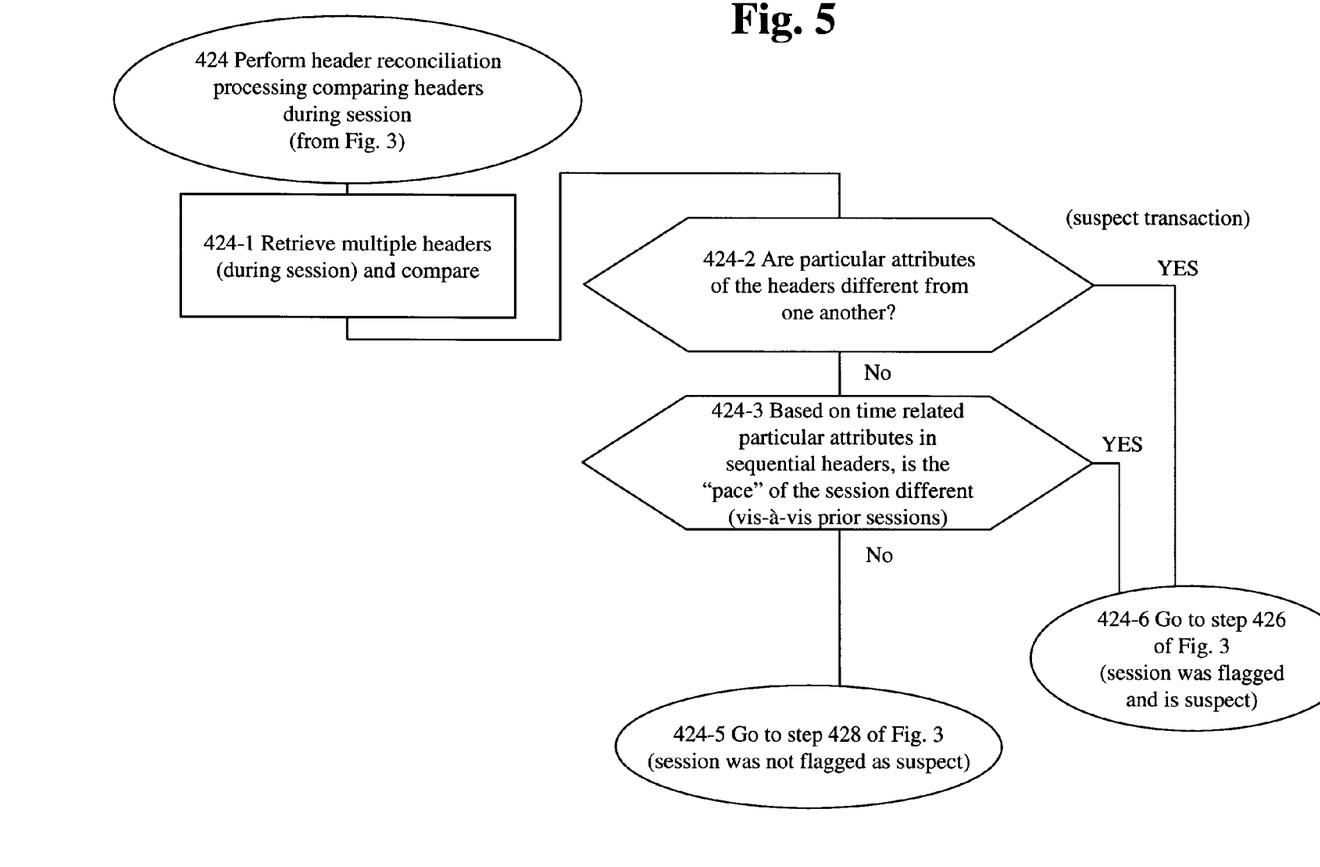
FIG. 5 is a yet further flowchart showing details of the processing of FIG. 3 in accordance with one embodiment of the invention.
Figure 6:
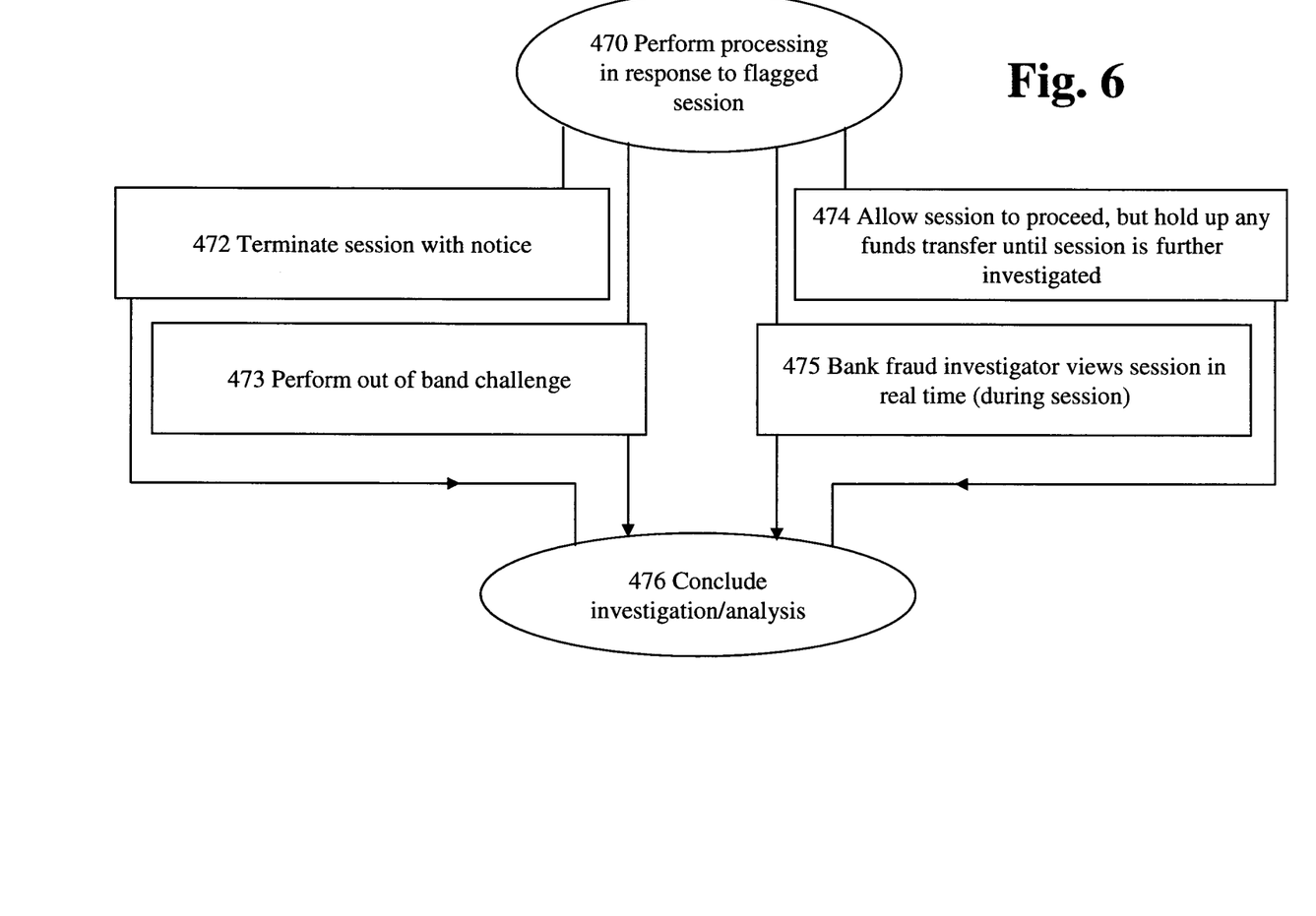
FIG. 6 is a flowchart showing processing that is performed in response to a flagged session.

FIG. 5 is a yet further flowchart showing details of the processing of step 424 of FIG. 3 in accordance with one embodiment of the invention.

The process of FIG. 5 starts in step 424, and passes to step 424-1. In step 424-1, the process retrieves multiple headers during the course of a session, and compares those headers.

Then in step 424-2, based on the comparison, decisioning is made whether particular attributes of the headers are different from one another. If yes in step 424-2, processing passes to step 424-6, as described below. If no, then the process passes to step 424-3.

In step 424-3 decisioning is performed to determine whether, based on time related attributes in sequential headers, is the "pace" of the session different. That is, different vis-à-vis prior sessions, for example (or alternately other observed or known paces). If yes in step 424-3, processing passes to step 424-6, as described below. If no in step 424-3, then the process passes to step 424-5.

In step 424-5, the process goes to step 428 of FIG. 3, reflecting that the session was not flagged as suspect.

On the other hand, if the process passes to step 424-6, as described above, then in step 424-6, the process goes to step 426 of FIG. 3 (session was flagged and is suspect) and further processing is performed accordingly.

FIG. 6 is a flowchart showing processing that is performed in response to a flagged session. FIG. 6 reflects that various different processing may be performed in response to identifying a suspect session, as described above. The various processing of FIG. 6 is illustrative, and may be performed sequentially, alternatively, or in parallel, for example.

In accordance with one embodiment, the invention analyzes the pace of the client's interaction with the website over the course of the transaction. For example, a client may read slowly and therefore take extended periods of time to enter information and submit the information to the system. Other clients may hesitate significantly when they are presented with the final "approval" action in a financial transaction. Yet other clients may speed through web transactions with alacrity. In summary, the pace of a client's interaction with a website can be a defining behavioral characteristic. The invention then detects these characteristics and observes a client's pace to detect uncharacteristic behavior. The detection of an uncharacteristic pace may, of course, indicate nothing significant. However, an uncharacteristic pace may also indicate a problem, such as when an imposter is performing the web interaction or a hacker is using scripts to complete a transaction through the website.

In accordance with one embodiment of the invention, the pace characteristics of a particular individual or account are tracked over a period of time. Whenever the individual interacts with the website the system compares the pace of the current transaction with the pace of previous transactions. This comparison may be based on a variety of sources for time information. For example, the system may observe the pace of the interaction by tracking the chronology of the receipt of transmissions from the individual. In such a case, the receipt of such information would of course be affected by general latency factors inherent in network communications. The system may also observe the pace of the interaction by analyzing time stamps in the header of any information sent by the individual.

The system may perform the comparison of the current transaction's pace to previous transactions using a variety of algorithms. In some cases simple rules may suffice to identify uncharacteristic pace. For example, a system may flag any transaction meeting the criteria: "checking account withdrawal >$10,000 AND duration <3 seconds." A wide variety of other pattern analysis algorithms are available to perform the comparison. These approaches include, but are not limited to the following or combinations thereof: statistical and syntactical models, Bayesian classifiers, and neural networks.

Hereinafter, general aspects of implementation of the systems and methods of the invention will be described.

As described above, FIG. 1 shows an embodiment of the system of the invention. Further, FIGS. 2-6 show various processes of embodiments of the method of the invention. The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above in the flowcharts. Such a set of instructions for performing a particular task may be characterized as a program, software program, or simply software.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general purpose computer. However, the processing machine described above may also utilize any of a wide variety of other technologies including a special purpose computer, a computer system including a microcomputer, mini-computer or mainframe for example, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the Microsoft Windows™ Vista™ operating system, the Microsoft Windows™ XP™ operating system, the Microsoft Windows™ NT™ operating system, the Windows™ 2000 operating system, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing as described above is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, or any client server system that provides communication, for example. Such communications technologies may use any suitable protocol such as TCP/IP, UDP, or OSI, for example.

As described above, a set of instructions is used in the processing of the invention. The set of instructions may be in the form of a program or software. The software may be in the form of system software or application software, for example. The software might also be in the form of a collection of separate programs, a program module within a larger program, or a portion of a program module, for example The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, a EPROM, a wire, a cable, a fiber, communications channel, a satellite transmissions or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, voice reader, voice recognizer, dialogue screen, menu box, list, checkbox, toggle switch, a pushbutton or any other device that allows a user to receive information regarding the operation of the processing machine as it processes a set of instructions and/or provide the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications and equivalent arrangements.

What is claimed is:

1. A method that detects fraud in an electronic communication session performed over a network, the session including data transmissions between a purported customer and a bank operating system, the data transmissions from the purported customer including headers from, and generated by, a purported customer user device of the purported customer, the method performed by at least one computer processor of the bank operating system, the method including:
    with a first communication from the purported customer user device during the session, inputting a first header by the computer processor, the first header including first header attributes;
    with a second communication from the purported customer user device during the session, inputting a second header by the computer processor, the second header including second header attributes;
    comparing the first header attributes with the second header attributes from the different data transmissions with the purported customer user device of the purported customer during the same session, wherein the comparing of header attributes from different data transmissions during the session includes: comparing the first header that is associated with the data transmission from the user device of the purported customer at login with the second header that is associated with a later data transmission from the user device of the purported customer in the same session;
    determining that the first header attributes are different from the second header attributes; and
    flagging, based on the determining that the header attributes are different, the session as suspect of fraud; and
    outputting a communication indicative of such flagging.

2. The method of claim 1, wherein the headers are in the form of https: headers.

3. The method of claim 1, wherein the network is the Internet.

4. The method of claim 1, wherein the session includes the purported customer using a web page of the bank operating system.

5. The method of claim 1, wherein the comparing header attributes from different data transmissions during the session includes:
    comparing multiple headers from the purported customer user device input during the session.

6. The method of claim 5, wherein headers of sequential data transmissions are compared during the session.

7. The method of claim 6, wherein time attributes of the sequential headers are compared.

8. The method of claim 6, wherein headers of sequential data transmissions are compared so as to generate an observed pace of the session, the method including comparing the observed pace with known pace information.

9. The method of claim 8, wherein the known pace information was previously secured based on sessions with the purported customer, who was at such time legitimized.

10. The method of claim 8, wherein the known pace information was previously secured based on sessions with other customers.

11. The method of claim 8, wherein the known pace information was previously secured based on capabilities of the legitimate technologies involved and human traits.

12. The method of claim 1, further including comparing header between communications of different customers to detect fraud.

13. A computer processing system that detects fraud in an electronic session performed over a network, the session including communications between a purported customer and a bank operating system, the communications from the purported customer including headers from, and generated by, a purported customer user device of the purported customer, the system comprising:
    a header processor, that:
        with a first communication from the purported customer user device during the session, inputs a first header that includes first header attributes, the first header attributes comprising a first device signature of the purported customer user device;
        with a second communication from the purported customer user device during the session, inputs a second header that includes second header attributes, the second header attributes comprising a second device signature of the purported customer user device;
        compares the first device signature with the second device signature from the different communications with the purported customer user device of the purported customer during the session;
        determines that the comparison of the first device signature with the second device signature is irregular; and
        flags, based on the determining that the device signatures are irregular, the session as suspect of fraud; and
    a flagged session processor that performs processing on the flagged session so as to investigate fraud; and
    wherein the comparison of the device signatures from different communications with the user device of the purported customer during the session includes:
        comparing the first header that is associated with a communication from the user device of the purported customer at login with the second header that is associated with a later communication from the user device of the purported customer in the same session.

14. The computer processing system of claim 13, wherein the headers are in the form of https: headers.

15. The computer processing system of claim 13, wherein the flagged session processor terminates the session with the customer based on the flagging of the session.

16. The computer processing system of claim 13, wherein the flagged session processor performs an out of band challenge based on the flagging of the session.

17. A non-transitory computer readable medium that detects fraud in an electronic session performed over a network, the session including communications between a purported customer and a bank operating system, the communications from the purported customer including headers from a purported customer user device of the purported customer, the computer readable medium comprising:

a first computer readable medium portion that when executed causes at least one processor to:

with a first communication from the purported customer user device during the session, input a first header that includes first header attributes, the first header attributes comprising a first device signature of the purported customer user device;

with a second communication from the purported customer user device during the session, input a second header that includes second header attributes, the second header attributes comprising a second device signature of the purported customer user device;

compare the first device signature with the second device signature from the different communications with the purported customer user device of the purported customer during the session;

determine that the comparison of the first device signature with the second device signature is irregular; and         flag, based on the determining that the device signatures are irregular, the session as suspect of fraud; and     a second computer readable medium portion that when executed cause the at least one processor to perform processing on the flagged session so as to investigate fraud; and     wherein the comparison of the device signatures from different communications with the user device of the purported customer during the session includes:

comparing the first header associated with a communication from the user device of the purported customer at login with the second header associated with a later communication from the user device of the purported customer in the same session.

18. A method that detects fraud in an electronic session performed over a network, the session including different communications between a purported customer user device of a purported customer and a bank operating system, the different communications from, and generated by, the purported customer user device of the customer each including a header, the method performed by at least one computer processor of the bank operating system, the method including:

with a first communication from the purported customer user device during the session, inputting a first header by the computer processor, the first header including first header attributes;

with a second communication from the purported customer user device during the session, inputting a second header by the computer processor, the second header including second header attributes;

comparing the first header attributes with the second header attributes from the different communications with the purported customer user device during the session;

determining that the first header attributes are different from the second header attributes; and     flagging, based on the determining that the header attributes are different, the session as suspect of fraud; and     the session includes the purported customer using a web site of the bank operating system comprised of a plurality of web pages, the purported customer effecting a login to gain access to the web site;

the comparing header attributes from different communications during the session includes:

comparing the first header associated with the communication from the purported customer at login to the second header used later in the session; and         comparing headers of sequential communications including comparing time attributes of the sequential headers; and         wherein time attributes of the sequential headers are compared so as to generate an observed pace of the session, the pace constituted by a time line of the purported customer's actions as represented in the data of the header; and     comparing the observed pace with known pace information, the known pace information previously secured based on sessions with the purported customer, who was at such time legitimized.

\* \* \* \* \*